July 2, 1935.　　　L. W. G. FLYNT　　　2,006,828

RETRACTABLE COUPLING

Filed June 6, 1933

INVENTOR
Louis W. G. Flynt
BY C. C. Cousins
ATTORNEY

Patented July 2, 1935

2,006,828

UNITED STATES PATENT OFFICE 2,006,828

RETRACTABLE COUPLING

Louis W. G. Flynt, East Orange, N. J., assignor to Breeze Corporations, Inc., Newark, N. J.

Application June 6, 1933, Serial No. 674,513

6 Claims. (Cl. 285—84)

This invention relates to a retractable coupling.

In many arts it is common to use conduits having coupling members at the ends thereof. The conduits may be either rigid or flexible. They may be made of various materials and may be used as passages for fluids, as protective casings, as radio shields for electrical equipment and for other uses.

The coupling herein is described in connection with its use on gasoline and oil lines for airplanes, for which use it is particularly suited, but it will be obvious that it may be used in many other capacities.

Conduits having coupling members are usually used to make connection between two stationary or fixed units. For example, a conduit such as described herein, may be connected between the outlet on a gasoline tank and the intake on a carburetor. Both the tank and the carburetor are provided with projecting, exteriorly screw-threaded members, to which the securing element or nuts of the coupling is screwed.

In order to allow for engagement of the securing members of the couplings with the projecting members on the tank or carburetor, the overall length of the conduit with its couplings must be greater than the distance between the extremities of the projecting members on the tank or carburetor.

Where a flexible conduit is used and the distance between the two points of connection is relatively long, it is possible to flex the conduit to shorten the distance between its ends to permit the conduit being placed in position to be secured to the outlets on the tank and carburetor. However, it often happens that the distance between the two units to which the ends of the conduits are to be connected is relatively short. In some cases the length of the coupling members constitutes the greater part of the length of the entire conduit. Under these circumstances it is not possible to flex the conduit sufficiently to permit its being placed in position. Where rigid conduits are used bending or flexing of the conduit is not possible.

Therefore, the object of this invention is to provide a coupling which will permit the overall length of a conduit to be temporarily shortened to allow the conduit to be placed in position between two fixed points.

Specifically, the object of the invention is to provide a coupling having a portion which may be retracted to shorten the coupling.

In many cases, and particularly on airplanes, the space in which a connection must be made is very limited. It is not possible to use a large coupling nut having an inside diameter sufficient to permit its being slipped back over the conduit. In most cases the outside diameter of the coupling nut or securing member must be restricted to a little more than the diameter of the body of the conduit. Therefore, a further object of the invention is to provide a coupling having a retractable portion, the outside diameter of which will not be greater than the outside diameter of the remainder of the coupling.

Since it is essential on gasoline and other lines that a fluid-tight connection be had, a further specific object of the invention is to provide a coupling having a retractable portion which, when extended, will make a fluid-tight joint with its associated parts.

In use on airplanes couplings are subjected to continuous vibration and are apt to become loose by reason thereof. Therefore, a further specific object of the invention is to produce a retractable coupling having means to lock the retractable portion against casual loosening due to vibration or other causes.

The invention consists of the construction, combination and arrangement of parts as herein illustrated, described and claimed.

In the accompanying drawing, forming part hereof, is illustrated one form of embodiment of the invention, in which drawing similar reference characters designate corresponding parts and, in which.

Figure 1:
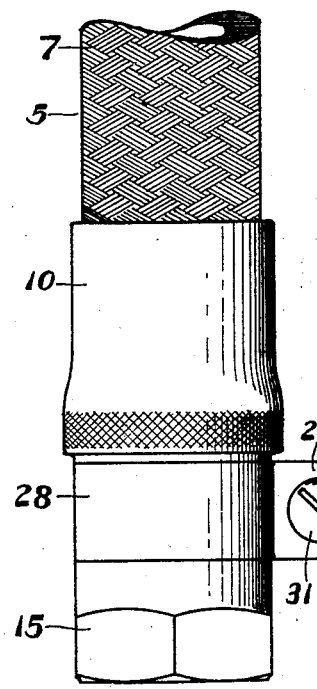
Figure 1 is an elevation of a coupling and a portion of the conduit.
Figure 2:
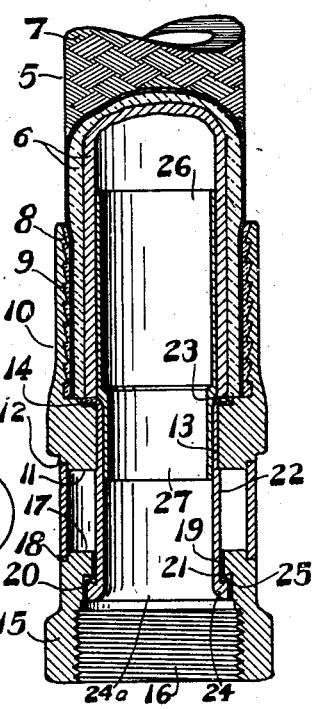
Figure 2 is a longitudinal section through a coupling with a portion of a conduit in plan and partly broken away.

Referring to the drawing, 5 designates a conduit which may be either flexible or rigid and which may be one of several types. The conduit 5 shown is a conventional type comprising a plurality of layers 6 having an outer covering 7.

On the end of the conduit 5 is disposed a sleeve or collar 8 of resilient material adapted to receive the internal teeth 9 of a sleeve 10 which is swaged on or otherwise secured to the end of the conduit 5. The sleeve 10 has an end wall 11, the outer edge of which is recessed to form a seat 12. The sleeve 10 is provided with a bore 13, the inner end of which is recessed at 14.

Spaced from the sleeve 10 and in axial alignment therewith is a securing member or nut 15 provided with interior screw-threads 16 on its outer end. The opposite end wall 17 of the nut 15 has its outer edge recessed to form a seat 18. The nut 15 is provided with a bore 19 of a diameter slightly larger than the diameter of the bore 13 in the sleeve 10, adjacent which is a recess 20 having an angular wall 21.

The nut 15 is held with relation to the sleeve 10 by means of a tubular retaining element 22 which is disposed through the bore 19 in the nut 15 and which extends through the bore 13 in the sleeve 10. The inner end 23 of the member 22 is bent into the recess at 14 in the sleeve 10 to hold the member 22 securely in place. The member 22 makes a close fitting with the bore 13 but the nut 15 is free to rotate on the member 22 by reason of the bore 19 being slightly larger than the bore 13. The outer end of the member 22 is provided with an annular flange 24 having an outwardly extending angular lip 25. The lip 25 is adapted to lie in the recessed portion adjacent the angular wall 21 of the nut 15, and when the coupling is secured in position, to make a fluid-tight connection between the members 22 and the nut 15. At the same time the pressure of the lip 25 on the wall 21 prevents spreading or outward distortion of the nut 15. The inner edge 24a of the flange 24 may be curved or of any other suitable contour to abut the connecting member of a fixed unit such as the outlet of a gasoline tank.

Disposed inside of the sleeve 10 is a re-inforcing tube 26 provided with an extension 27 which extends into the tubular member 22 and is frictionally held therein.

Seated in the seats 12 and 18 on the members 10 and 15, respectively, is a retaining or locking ring 28 formed of a single strip of spring metal bent upon itself and having its ends 29 bent outwardly so as to lie in parallel relation. The ends 29 are provided with openings 30 through which is disposed a bolt 31 on which is carried a lock washer 32 and the ensemble is held securely in position by a nut 33.

Figure 3:
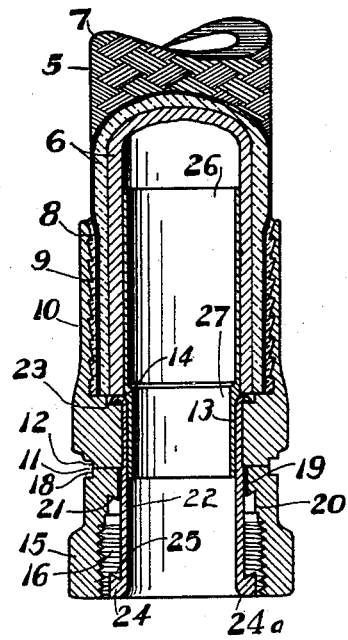
Figure 3 is a longitudinal section through a coupling with a portion of a conduit in plan and partly broken away, showing the coupling in retracted position; and, Figure 4 is a composite perspective view of a retaining means and its associated parts.
Figure 4:
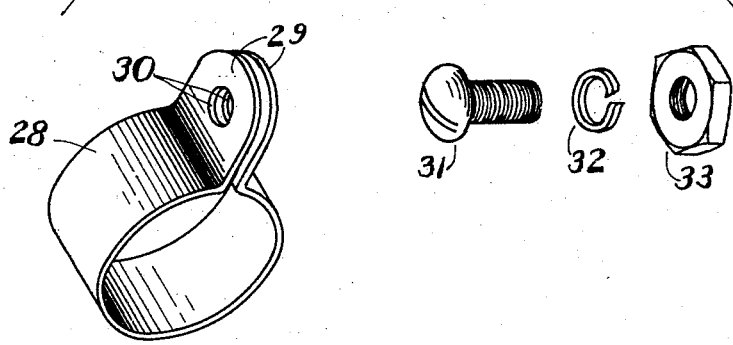

When it is desired to apply a conduit between two fixed points the locking ring 28 is loosened and unseated, permitting the member 15 to be retracted on the member 22, so that the end wall 17 of the member 15 will abut the end wall 11 of the sleeve 10, as shown in Figure 3. When in this position the over-all length of the conduit and the couplings will be no greater than the distance between the extremities of the members 22 on the ends of the conduits. The conduit may now be placed between the two fixed connections so that the inner edges 24a on the respective members 22 will abut the respective outlets on the fixed connections. The members 15 on each end of a conduit may now be screwed into engagement with the respective fixed connections. When the nut 15 is tightened a fluid-proof connection will be made by the lip 25 as heretofore described. When such connection has been made the clearance between the walls 11 and 17 will be sufficient to receive the locking ring 28 which will be seated on the seats 12 and 18, and secured in place by the bolt 31 and the nut 33. When the bolt 31 is tightened the ends 29 of the ring 28 do not come in contact but the ring 28 imposes a resilient load on the seats 12 and 18, thus acting as a brake to prevent rotary or angular movement of the nut 15 with relation to the sleeve 10. Aside from acting as a brake the ring 28 locks the nut 15 in position by preventing axial movement of the nut 15 toward the sleeve 10.

Having thus fully described the invention, what is claimed as new and desired to be secured by Letters Patent, is:

1. A hose coupling comprising a sleeve to surround the end of a hose, a securing member movable with relation to the sleeve, connecting means between the sleeve and the securing member and means carried by the sleeve and the securing member to lock the securing member against axial movement with relation to the sleeve.

2. A hose coupling comprising a sleeve secured to the end of a hose, a tubular member secured inside the sleeve and projecting therefrom, a securing element rotatably disposed on the tubular member and spaced from the sleeve and means to prevent either rotary or axial movement of the securing element comprising a locking ring disposed between the sleeve and the securing element and bearing on a portion of both the sleeve and the securing element.

3. A hose coupling comprising a sleeve secured to the end of a hose, a securing element spaced therefrom in axial alignment, the adjacent ends of the sleeve and securing member being recessed to form complementary seats, a connecting member between the sleeve and securing element and a retaining member adapted to fit in said seats.

4. A hose coupling comprising a sleeve secured to the end of a hose, a securing element spaced therefrom in axial alignment, the adjacent ends of the sleeve and securing member being recessed to form complementary seats, a connecting member between the sleeve and securing element and a retaining member adapted to fit in said seats to maintain the sleeve and securing element in spaced relation.

5. A hose coupling comprising a sleeve secured to the end of a hose, a rotatable securing element spaced therefrom in axial alignment, the adjacent ends of the sleeve and securing member being recessed to form complementary seats, a connecting member between the sleeve and securing element and a retaining member adapted to fit in said seats to maintain the sleeve and securing element in spaced relation and to prevent rotation of the securing element.

6. In combination with a fluid conduit adapted to be disposed between two fixed points, a retractable coupling means comprising a sleeve secured on the end of the conduit, a tubular member secured in the sleeve and projecting therefrom, a securing element carried on the tubular member, said securing element normally extending past the end of the tubular member and being axially retractable on the tubular member and means to maintain the securing element in normal position comprising a locking ring disposed between the sleeve and the securing element and bearing on both the sleeve and the securing element.

LOUIS W. G. FLYNT.